(12) United States Patent
Diamante

(10) Patent No.: US 6,488,457 B2
(45) Date of Patent: Dec. 3, 2002

(54) LATCHING SYSTEM FOR A PALLETIZED SYSTEM OF AN AIRCRAFT

(75) Inventor: Richard G. Diamante, Renton, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/799,161

(22) Filed: Mar. 5, 2001

(65) Prior Publication Data

US 2002/0122709 A1 Sep. 5, 2002

(51) Int. Cl.⁷ .................................................. B60P 7/08
(52) U.S. Cl. ............................. 410/84; 410/46; 410/77
(58) Field of Search .......................... 410/84, 69, 77, 410/78, 79, 80, 46; 248/500, 503, 503.1; 292/285; 244/118.1, 118.5, 118.6, 137.1, 137.2; 108/55.1, 55.5

(56) References Cited

U.S. PATENT DOCUMENTS

| | | | |
|---|---|---|---|
| 2,858,774 A | * 11/1958 | Batten | 410/67 |
| 3,251,489 A | * 5/1966 | Davidson | 410/79 |
| 3,288,411 A | * 11/1966 | Davidson | 410/79 |
| 3,357,372 A | * 12/1967 | Bader | 410/69 |
| 3,377,040 A | 4/1968 | Hansen | |
| 3,381,921 A | * 5/1968 | McDonough et al. | 410/79 |
| 3,480,239 A | * 11/1969 | Jensen et al. | 410/79 |
| 3,486,204 A | * 12/1969 | Hurtner et al. | 410/77 X |
| 3,605,637 A | 9/1971 | Prete, Jr. | |
| 3,652,050 A | 3/1972 | Marrujo et al. | |
| 3,693,920 A | 9/1972 | Trautman | |
| 3,698,679 A | 10/1972 | Lang et al. | |
| 3,741,504 A | 6/1973 | Alberti et al. | |
| 3,741,508 A | 6/1973 | Alberti | |
| 3,759,476 A | 9/1973 | Goodwin | |
| 3,796,396 A | 3/1974 | Crovella | |
| 3,810,534 A | 5/1974 | Prete, Jr. | |
| 3,986,460 A | 10/1976 | Voigt et al. | |

(List continued on next page.)

*Primary Examiner*—Stephen T. Gordon
(74) *Attorney, Agent, or Firm*—Harness, Dickey & Pierce, P.L.C.

(57) ABSTRACT

A pallet latching mechanism for a palletized system of an aircraft. The latching mechanism includes a frame within which are pivotally disposed a first pawl and a second pawl. The first pawl has a handle associated therewith. Each of the pawls have camming surfaces and are spring biased by associated torsion springs. Movement of the first pawl via the handle into locking engagement with an associated restraining pin of a rail assembly secured to a floor of the aircraft substantially simultaneously causes locking engagement of the second pawl with a different one of the restraining pins. A safety latch system associated with the handle ensures that once the mechanism is placed in the locked position it cannot be accidentally moved into an unlocked position without first releasing the safety latch system. The latching mechanism even more effectively restrains a palletized system associated therewith against forward and aft movement.

17 Claims, 4 Drawing Sheets

U.S. PATENT DOCUMENTS

| | | | |
|---|---|---|---|
| 4,000,870 A | * 1/1977 | Davies | 410/92 |
| 4,175,656 A | 11/1979 | Lang | |
| 4,234,278 A | 11/1980 | Harshman et al. | 410/69 |
| 4,331,412 A | * 5/1982 | Graf | 410/69 |
| 4,341,496 A | * 7/1982 | Carpenter et al. | 410/79 |
| 4,349,302 A | * 9/1982 | Ferguson, Jr. | 410/69 |
| 4,372,715 A | * 2/1983 | Naffa | 410/79 |
| 4,375,932 A | 3/1983 | Alberti | 410/69 |
| 4,388,030 A | 6/1983 | Skaale | 410/69 |
| 4,395,172 A | * 7/1983 | Hoener et al. | 410/84 |
| 4,449,875 A | * 5/1984 | Brunelle | 410/80 |
| 4,498,823 A | 2/1985 | Trautman | 410/84 |
| 4,557,648 A | * 12/1985 | Koch et al. | 410/78 |
| 4,583,896 A | 4/1986 | Vogg et al. | 410/69 |
| 4,875,645 A | 10/1989 | Courter | |
| 5,004,387 A | 4/1991 | Jensen et al. | 410/69 |
| 5,011,348 A | 4/1991 | Jensen et al. | 410/79 |
| 5,236,153 A | 8/1993 | LaConte | |
| 5,310,297 A | * 5/1994 | Benjamin | 410/77 |
| 5,383,630 A | 1/1995 | Flatten | |
| 5,486,077 A | 1/1996 | Nutting | 410/69 |
| 5,489,172 A | 2/1996 | Michler | 410/105 |
| 5,564,654 A | 10/1996 | Nordstrom | |
| 5,575,389 A | 11/1996 | Alspach et al. | |
| 5,827,022 A | * 10/1998 | Tovani | 410/78 |
| 5,957,406 A | 9/1999 | Nelson et al. | |
| 6,193,453 B1 | * 2/2001 | Kernkamp | 410/79 |
| 6,302,358 B1 | * 10/2001 | Emsters et al. | |

* cited by examiner

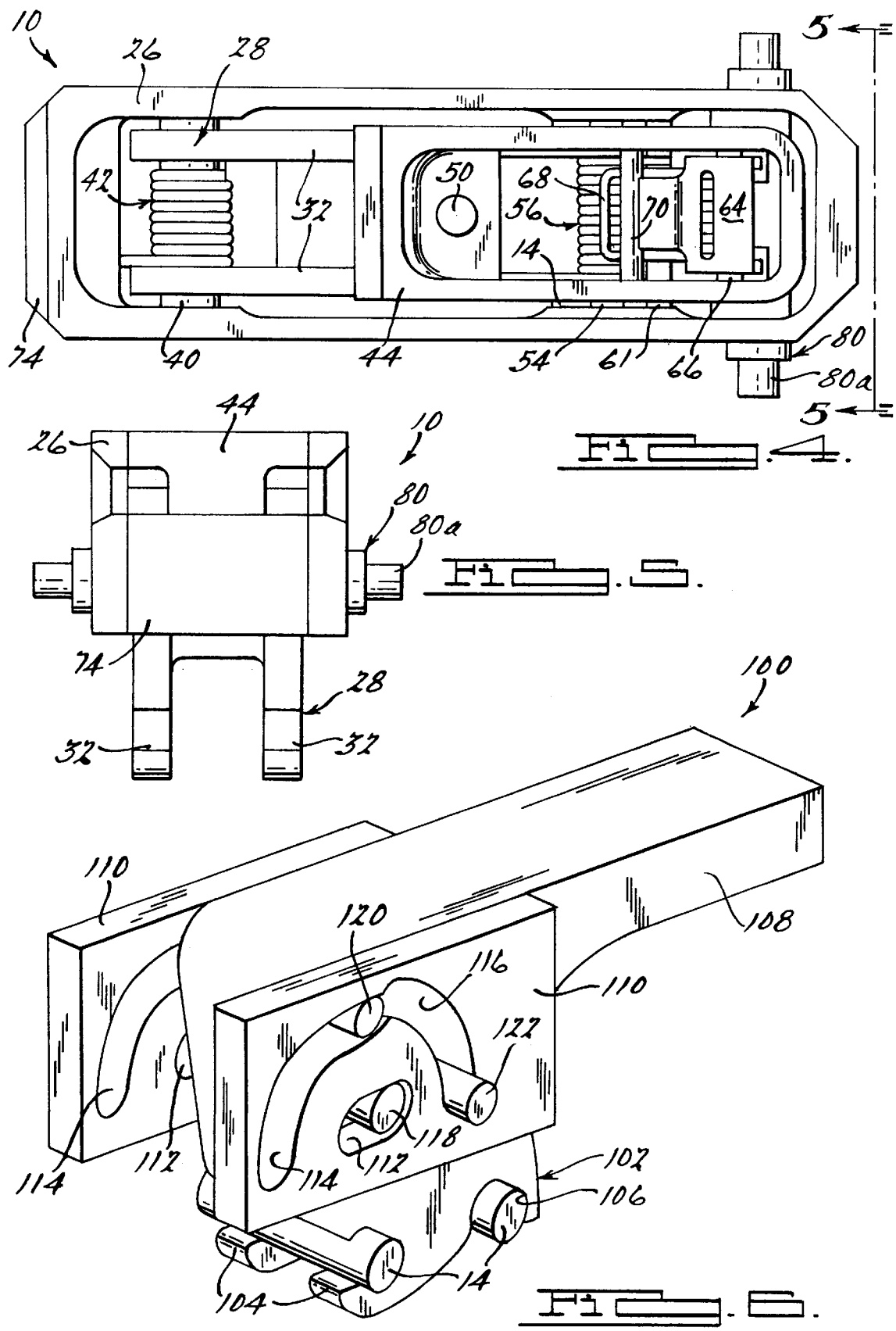

LATCHING SYSTEM FOR A PALLETIZED SYSTEM OF AN AIRCRAFT

FIELD OF THE INVENTION

The present invention relates generally to a palletized seating system, and more particularly to a latching palletized seating system specifically adapted for use on aircraft to allow quick removal of palletized seats, to thereby enable an aircraft to be converted from a passenger aircraft to a freight aircraft and vice versa.

BACKGROUND OF THE INVENTION

Aircraft are used in a wide variety of applications to transport individuals as well as freight. It is highly desirable to be able to use the aircraft for either application. To this end, various forms of cargo latching systems have been developed to allow quick and easy removal of pallets upon which are mounted one or more seats of an aircraft. Once the pallets containing the seats have been removed, the fuselage of the aircraft can be used to carry cargo instead of individual passengers. One such patent directed to a pallet latching system is U.S. Pat. No. 3,381,921 assigned to the Boeing Company. This patent involves the use of a plurality of longitudinally aligned rail assemblies mounted in the floor of the aircraft. Each rail assembly comprises a plurality of elongated base sections having a plurality of anchoring elements located at closely spaced longitudinal intervals therealong. Each rail assembly also has a plurality of pallet conveying rollers which are located laterally of the seat pallet anchoring elements and spaced at suitable intervals longitudinally therealong to provide a substantially continuous pallet conveying surface or plane located just above the rail assembly. A plurality of retractable cargo pallet latch units are mounted to a lower part of a seat pallet. The seat pallet is able to be rolled along the rollers of the rail assembly to a desired position and then latched in place via engagement of the latching mechanism with one of the anchoring elements.

While the above arrangement has proven effective for its intended use, it is nevertheless necessary to provide a latch design that meets new and increased requirements for maintaining palletized seats restrained to the floor structure of an aircraft in the event of floor deformations caused by emergency landing conditions, and to ensure adequate visual indication of proper engagement of the latching mechanism when the mechanism is in a latched position. More specifically, a latching mechanism is needed which operates to positively restrain the palletized seats to the floor of the aircraft in both fore and aft directions during emergency landing conditions while still maintaining the ability of the pallets to be quickly installed and removed when it is desired to convert the aircraft from a passenger aircraft to a freight aircraft, or vice versa.

Still further, a latching mechanism is needed which provides the above benefits but which does not unduly increase turnaround time for converting the aircraft between passenger and freight applications, and which does not allow the seats to move or rattle in a manner which would be objectionable to passengers when the aircraft is in a passenger carrying configuration.

SUMMARY OF THE INVENTION

The above and other objects are provided by a palletized seat latching mechanism in accordance with preferred embodiments of the present invention. In one preferred embodiment the latching mechanism incorporates a first pawl and a second pawl both pivotably disposed within a frame. Each pawl further includes camming surfaces which contact each other as the first pawl is moved from an unlocked position into a locked position relative to one of a plurality of restraining pins of a conventional support rail assembly secured to the floor of the aircraft. The first pawl functions to restrain a pallet to which it is secured against forward movement. The camming surfaces operate to cause the first pawl to urge the second pawl into locked engagement with a separate restraining pin as the first pawl is moved into its locked position. The second pawl restrains the seat pallet from moving in the aft direction. Advantageously, if either one of the pawls is not fully engaged with its respective restraining pin when the latching mechanism is secured to the rail assembly, the entire pallet will tend to rise or "bow" upwardly from the rail assembly, thus presenting a visual cue that the mechanism is not fully secured to the restraining pins of the rail assembly. This condition will also dramatically increase the force required to lock the pallet, thus providing a tactile clue that one of the pawls is not properly engaged. Torsion springs associated with each of the first and second pawls serve to tend to bias the pawls into an unlocked position. However, when the first pawl is urged into a locked position, it cammingly urges the second pawl substantially simultaneously into a locked position relative to a separate restraining pin.

In the preferred embodiments, one of the pawls incorporates a handle which can be grasped by a user to lock and unlock the latching mechanism from the rail assembly. The handle incorporates a safety latching assembly which serves to lock the handle to a secondary restraining pin carried on a frame portion of the latching mechanism such that the handle cannot be accidentally lifted without first disengaging a separate safety pawl carried by the handle. The safety latching mechanism also serves to automatically secure the handle in its locked position when the handle is urged into this position by the user without the user having to manipulate the safety pawl. When the handle is to be opened (i.e., to place the latching mechanism in an unlocked state), a simple tool such as a screwdriver is required to unlatch the safety pawl before the handle can be lifted into the unlocked position.

The latching mechanism of the present invention thus forms a simple yet effective means for restraining a palletized seat structure from both forward and aft movement during operation of the aircraft. The dual pawls of the latching mechanism further serve to ensure that the latching mechanism will not become disengaged from its associated rail assembly even in the event of flexing of the floor of the aircraft during an emergency landing procedure. The latching mechanism of the present invention further does not require significant modification to a standard palletized seat structure or to conventional rail assemblies used in present day aircraft in connection with palletized seat systems.

BRIEF DESCRIPTION OF THE DRAWINGS

The present invention will become more fully understood from the detailed description and the accompanying drawings, wherein:

FIG. 4 is a plan view of just the latching mechanism of FIG. 1 showing a frame thereof in elevation;

FIG. 5 is an end view of the latching mechanism of FIG. 4 taken in accordance with directional line 5—5 in FIG. 4; and FIG. 6 is a perspective view of an alternative preferred latching mechanism of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
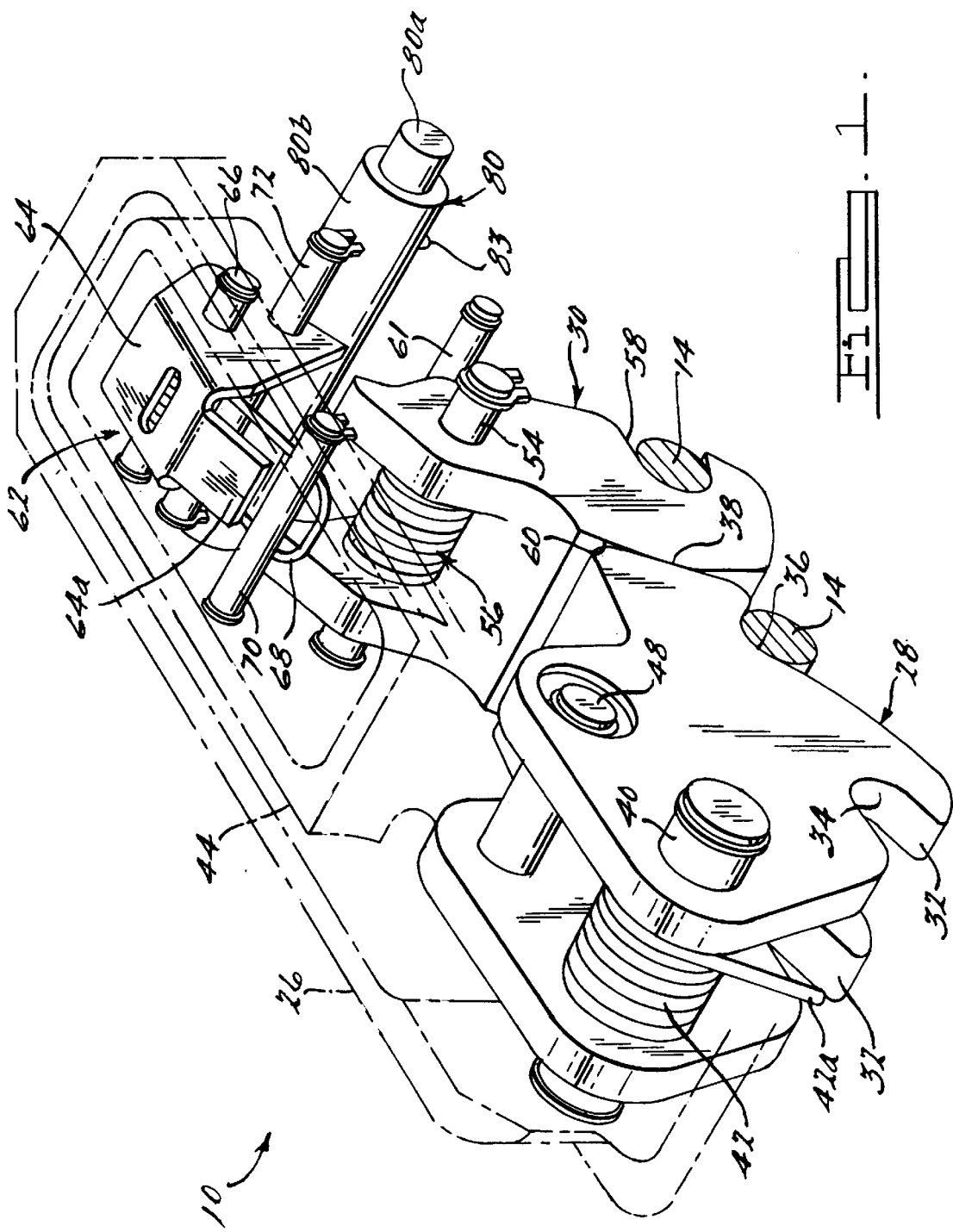
FIG. 1 is a perspective view of a latching mechanism in accordance with a preferred embodiment of the present invention.
Figure 2:
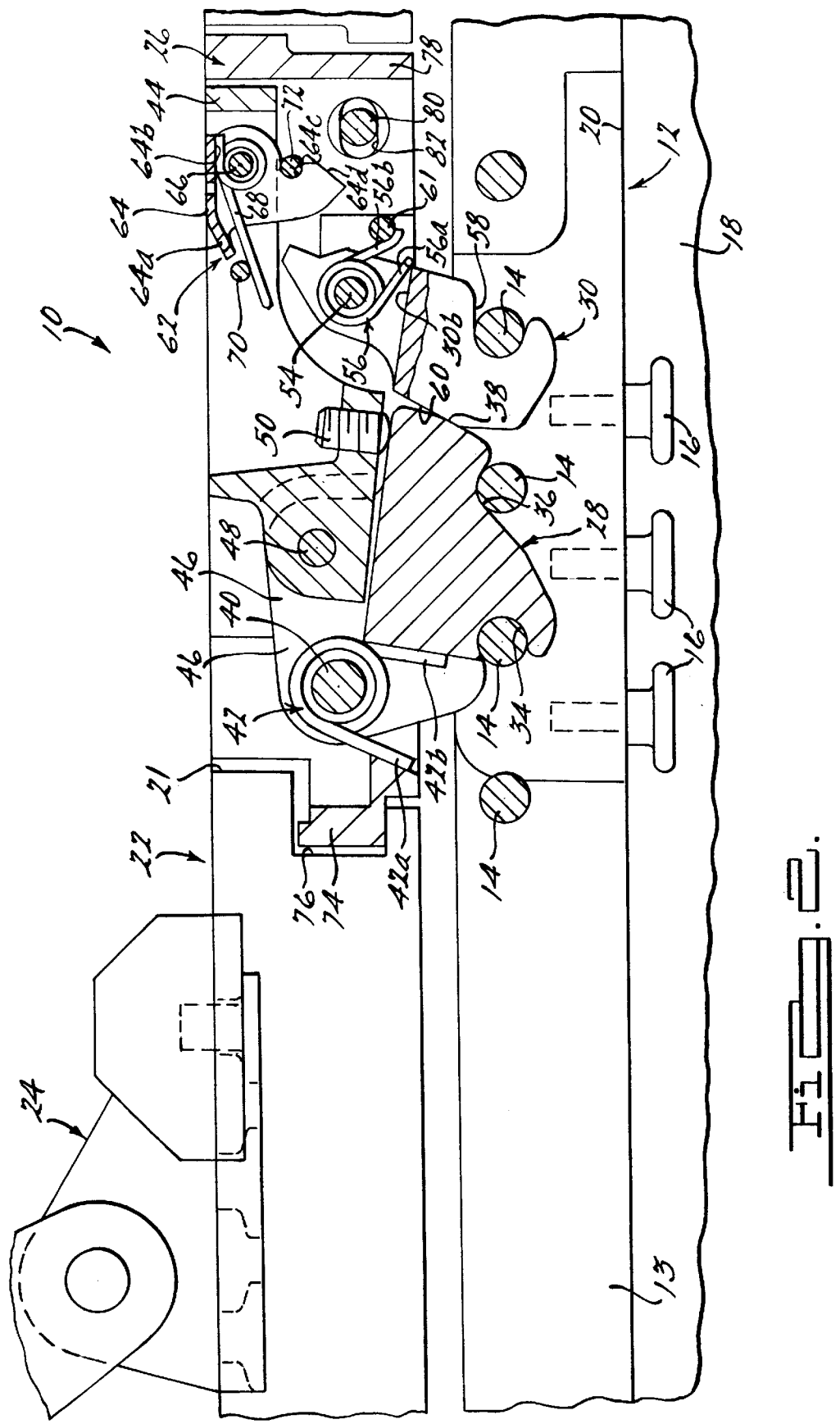
FIG. 2 is a side cross-sectional view of the latching mechanism of FIG. 1 showing the mechanism secured to a conventional rail assembly disposed on a floor of an aircraft, and wherein the latching mechanism is secured to a palletized seat system.
Figure 3:
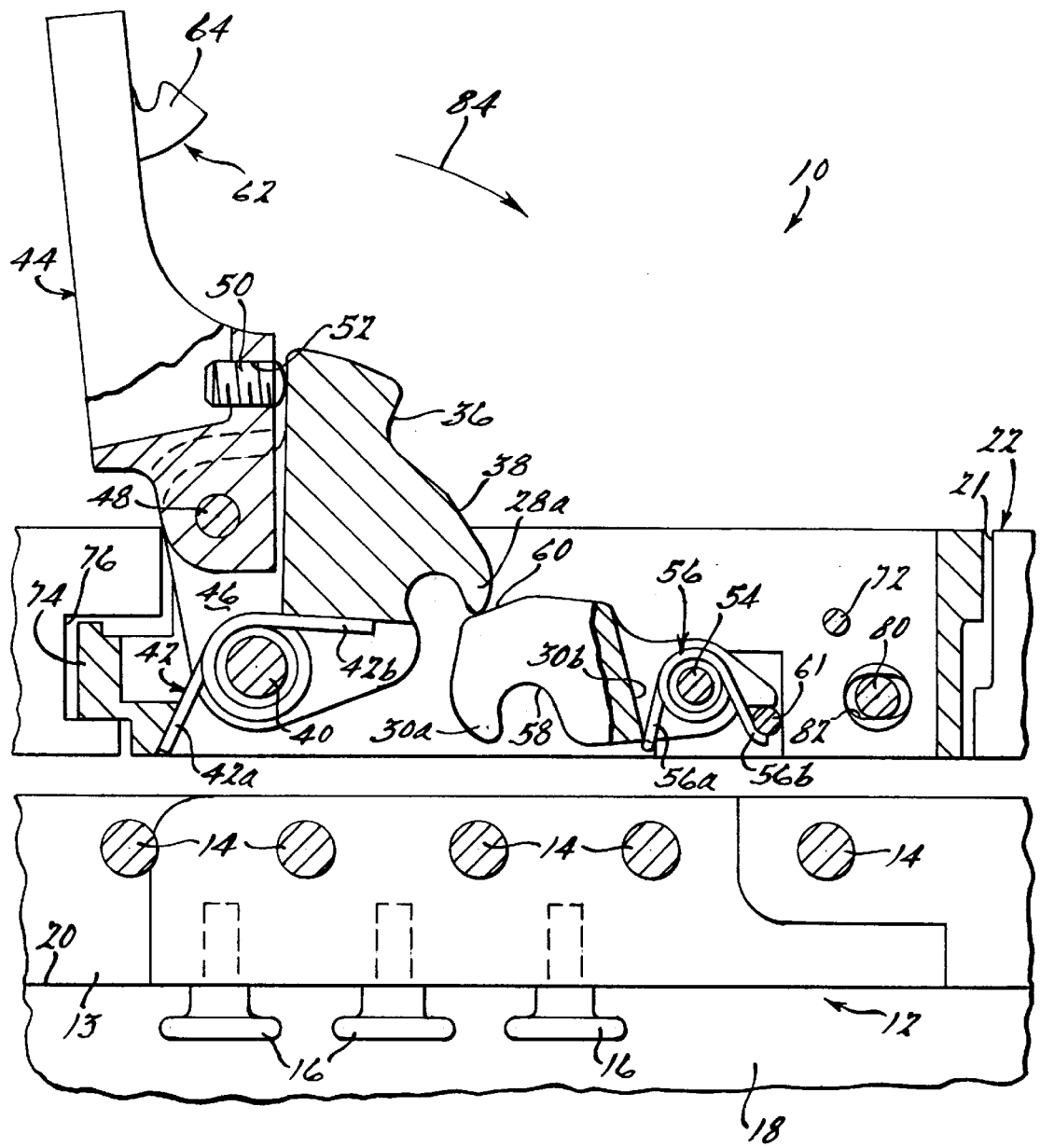
FIG. 3 shows the latching mechanism of FIG. 2 but with the mechanism in an unlatched position allowing the palletized seat system to be removed from the rail assembly.

Referring to FIGS. 1–3, there is shown a pallet latching mechanism 10 in accordance with a preferred embodiment of the present invention. The pallet latching mechanism, in FIGS. 2 and 3, is illustrated secured to a rail assembly 12. The rail assembly is a conventional assembly which is well known in the art and which includes a frame 13 for supporting a plurality of restraining pins 14 spaced evenly along the entire length of the frame 13, or at least a substantial portion of the length of the frame 13. The frame 13 comprises a "W" shape when viewed from one end or in cross section. A plurality of seat track attachment members 16 are used to secure the rail assembly 12 to a well known mounting rail 18 disposed within a floor 20 of an aircraft. The latching mechanism 10 is also installed within an opening 21 of a pallet 22 such that the pallet 22 cannot be separated from the latching mechanism 10. A seat fitting 24 is secured to the pallet 22 in a well known fashion such that the pallet 22 and seat fitting 24 together form a palletized seat system. Removal of the pallet 22 thus allows the mechanism 10, as well as all of the seats supported on the pallet 22, to be quickly and easily removed from the aircraft if the interior of the fuselage of the aircraft is to be reconfigured for transporting freight. Conversely, the pallet 22 can be easily installed to convert the aircraft from a freight carrying configuration into a passenger carrying configuration.

Returning now to FIGS. 1, 4 and 5, the latching mechanism 10 will be described in detail. The latching mechanism 10 includes a frame 26 which is shown in phantom in FIG. 1 so as not to obscure the view of other components of the mechanism. Within the frame 26 and supported by the frame is a first (i.e., fore) pawl 28 and a second (i.e., aft) pawl 30. The first pawl 28 includes a pair of parallel arms or plates 32 each having a notched portion 34, a recessed surface 36 and a camming surface 38. The arms 32 are supported on a pivot pin 40 which itself supports a torsion spring 42. The pivot pin 40 is supported within the frame 26, as best seen in FIGS. 2 and 3, to enable pivotable movement of the first pawl 28.

With specific reference to FIGS. 2 and 3, the first pawl 28 also includes an actuating handle 44 which is secured to a connecting portion 46 of the first pawl 28 via a connecting pin 48. Connecting pin 48 allows the handle 44 to be secured for pivotable movement relative to the connecting portion 46 of the first pawl 28. An adjustment set screw 50 retained in an opening 52 of the handle 44 allows a slight degree of adjustment of the handle to ensure proper latching of the handle when the handle is in its closed position. This will be explained further in the following paragraphs. It will also be noted that ends 42a and 42b of torsion spring 42 serve to bias the first pawl 28 toward the open position shown in FIG. 3.

Referring further to FIGS. 1–3, the second pawl 30 is pivotally secured to the frame 26 via a pivot pin 54 which is supported by the frame. A second torsion spring 56 is disposed around the pivot pin 54 to bias the second pawl 30 into the open position (FIG. 3). The second pawl 30 also includes a notched portion 58 and a camming surface 60. Torsion spring 56 includes ends 56a and 56b which bias the second pawl 30 toward the open position shown in FIG. 3 by contact with a shoulder 30b and a support pin 61.

The handle 44 carries a safety latch mechanism 62 which serves to secure the handle 44 in the closed position shown in FIGS. 1 and 2. The safety latch mechanism 62 includes a safety latch member 64 which is pivotably disposed on a pivot pin 66 and biased by a spring 68 such that a tongue portion 64a of the safety latch member 64 is biased continually downward in the position shown in FIG. 2. A support pin 70 abuts one end of the spring 68 while the opposite end of the spring 68 engages an undersurface 64b of the safety latch member 64 (FIG. 2). A safety latch pin 72 engages with a notch 64c formed in the safety latch member 64 to thus hold the handle 44 in the closed position shown in FIG. 2. Each of components 66, 68 and 70 are carried by the actuating handle 44.

With further reference to FIG. 2, the latching mechanism 10 includes a front projecting portion 74 which rests within a recess 76 in the opening 21 of the pallet 22. A rear end 78 of the mechanism 10 is supported within the pallet by a support pin 80 which extends through an elongated slot 82 formed in the frame 26. The support pin 80 is also shown in FIG. 1. The support pin 80 is a conventional assembly which has spring loaded opposing pins 80a (only one being visible in FIG. 1) for easy insertion thereof into the frame 26. A retaining pin 83 extends through an outer housing portion 80b of the support pin 80 to ensure that the support pin remains within the frame 26 once installed.

Turning now to the operation of the latching mechanism 10, the mechanism is shown in its fully unlocked position in FIG. 3. The torsion spring 42 and torsion spring 56 serve to maintain the pawls 28 and 30, respectively, in the raised position shown in FIG. 3. When the mechanism 10 is to be locked to the restraining pins 14 of the rail assembly 12, the mechanism 10 is positioned such that ends 28a and 30a of the pawls 28 and 30, respectively, are positioned approximately over one of the restraining pins 14. The user then grasps the handle 44 and urges the handle in the direction of arrow 84. This causes end 28a of pawl 28 to urge pawl 30 downwardly toward the restraining pins 14. As the handle 44 is rotated into the fully closed position shown in FIG. 2, the camming surface 38 of the first pawl 28 engages the camming surface 60 of the second pawl 30 so that the second pawl 30 is urged into engagement with an associated one of the restraining pins 14 substantially simultaneously with the first pawl 28 engaging a different associated one of the pins 14. The notches 34 and 58 in the pawls 28 and 30, respectively, are shaped to securely engage the restraining pins 14. Recessed surface 36 of the first pawl 28 provides a positive stop for the first pawl 28 when it contacts an associated one of the restraining pins 14.

With further reference to FIG. 2, as the handle 44 reaches its fully closed position, the safety latch member 64 is urged over the safety latch pin 72 such that the notched portion 64c engages with the safety latch pin 72. To facilitate this engagement, the safety latch member 64 includes an angled edge 64d which contacts the safety latch pin 72 as the handle 44 is moved into its fully closed position, and forces the safety latch member 64 to rotate slightly clockwise as the handle is moved into the fully closed position. The biasing force of torsion spring 68 causes the safety latch member 64 to snap into engagement with the safety latch pin 72 as the pin 72 moves over surface 64d. Once in this position, the handle 44 cannot be inadvertently lifted into the unlocked position of FIG. 3 without first inserting a screwdriver blade or like implement underneath tongue portion 64a and lifting upwardly against the biasing force of torsion spring 68 until surface 64d clears the safety latch pin 72. The set screw 50 allows a degree of adjustment of the handle 44 when the handle is in its closed position to ensure that the safety latch system 62 readily engages the safety latch pin 72 as the handle is moved into its fully closed position.

The latching mechanism 10 of the present invention thus provides a means for restraining movement of the seat pallet 22 in both the forward and aft directions. The mechanism 10 also ensures that the pallet 22 will not become separated from the rail assembly 12 in the event of an emergency landing which causes a small degree of flexing of the rail assembly 12, which might otherwise cause sufficient flexing of the restraining pins 14 to enable detachment of a single pawl-based latching mechanism. The latching mechanism 10 further provides the advantage that if both of the pawls 28 and 30 are not properly engaged with their respective restraining pins 14, the pallet 22 will tend to rise or "bow" upwardly from the rail assembly 12, thus providing a visual clue that the pallet 22 is not properly secured. This condtion would also likely dramatically increase the force needed to latch the pallet 22, thus also providing a tactile cue that the pallet 22 is not properly latched. Advantageously, the locking mechanism 10 does not require significantly added space within the pallet 22 or otherwise complicate the process of quickly and easily removing the pallet and/or reinstalling the pallet when the aircraft is to be changed from a passenger aircraft to a freight aircraft or vice versa.

Referring now to FIG. 6, a latching mechanism 100 in accordance with an alternative preferred embodiment of the present invention is shown. The latching mechanism 100 accomplishes engagement with two separate restraining pins 14 via a single pawl 102. In this instance, however, the pawl 102 includes a pair of first notches 104 and a pair of second notches 106 (only one being visible in FIG. 6). The pawl 102 includes a handle 108 and is supported between a pair of frame members 110. It will be appreciated that the frame members 110 will be supported by a suitable frame so as to maintain a desired, spaced apart distance therebetween. Alternatively, the frame members 110 could be integrally formed from a single piece member that is shaped to wrap around opposing sides of the handle 108.

Each of the frame members 110 includes an elongated slot 112, a first curving slot 114 and a second curving slot 116. Pivot pins 118, 120 and 122 extend through each of the slots 112, 114 and 116, respectively. The shapes of the slots 112, 114 and 116 are such that as the handle 108 is moved from its opened to its closed position, as shown in FIG. 6, the notches 104 and 106 of the pawl 102 engage with first one and then the other of the restraining pins 14. Thus, a single pawl 102 is able to restrain a pallet secured to the mechanism 10 against forward and aft movement.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A latching mechanism for use with a pallet to secure the pallet to a rail assembly, wherein the rail assembly is fixedly secured to a portion of a vehicle and includes a plurality of spaced apart restraining pins, to enable the pallet to be quickly and easily latched to and unlatched from the rail assembly, to thereby permit the pallet to be readily secured to or detached from the rail assembly, the latching mechanism comprising:

a frame;

a first pawl pivotally secured to said frame, said first pawl having a manually graspable handle operably associated therewith;

a second pawl pivotally secured to said frame adjacent said first pawl; and each of said pawls having surfaces adapted to engage as said first pawl is moved from an unlatched position to a latched position in engagement with a first one of said restraining pins via movement of said handle, and wherein said first pawl operates to urge said second pawl into engagement with a second one of said restraining pins as said first pawl engages said first one of said restraining pins.

2. The latching mechanism of claim 1, further comprising a biasing member associated with at least one of said pawls for urging said one pawl into an unlatched position relative to said rail assembly.

3. The latching mechanism of claim 1, wherein said handle further comprises a safety latch system for securing said handle when said first pawl is in said latched position.

4. The latching mechanism of claim 1, further comprising a safety latch system having a safety latch member pivotally mounted at a distal end of said handle; and a safety latch pin mounted to said frame; and wherein said safety latch member engages with said safety latch pin as said handle moves said first pawl into said latched position.

5. The latching mechanism of claim 4, further comprising a biasing member associated with said safety latch member for biasing said safety latch member into a locked position relative to said safety latch pin when said handle moves said first pawl into said latched position.

6. The latching mechanism of claim 1, wherein said first pawl includes a biasing member for urging said first pawl into said unlatched position and said second pawl includes a biasing member for urging said second pawl into an unlatched position.

7. A latching mechanism for use with a pallet to secure the pallet to a rail assembly, wherein the rail assembly is fixedly secured to a portion of a vehicle and includes a plurality of spaced apart restraining pins, to enable the pallet to be quickly and easily latched to and unlatched from the rail assembly, to thereby permit the pallet to be readily secured to or detached from the rail assembly, the latching mechanism comprising:

a frame;

a first pawl pivotally secured to said frame, said first pawl including a biasing member associated therewith for biasing said first pawl into an unlatched position relative to said restraining pins;

a second pawl pivotally secured to said frame adjacent said first pawl, said second pawl having a biasing member for urging said second pawl into an unlatched position relative to said rail assembly;

a handle associated with one of said pawls for urging said associated pawl toward a latched position relative to said restraining pins; and each of said pawls having surfaces adapted to cammingly engage with one another as said associated pawl is moved from an unlatched position to said latched position in engagement with a first one of said restraining pins as a result of movement of said handle, and wherein said associated pawl operates to urge said other pawl into a latched position in engagement with a second one of said restraining pins substantially simultaneously with engagement of said one pawl with said first restraining pin.

8. The latching mechanism of claim 7, further comprising a safety latch system operably associated with said handle for securing said handle against unintended movement when said pawls are both in their latched positions.

9. The latching mechanism of claim 8, wherein said safety latch system comprises:

a safety latch member pivotally secured to a portion of said handle;

a safety restraining pin secured to said frame;

a biasing member associated with said safety latch member for biasing said safety latch member into a normally locked position relative to said safety restraining pin; and wherein said safety latch member is disposed on said handle so as to automatically engage said safety latch pin when said handle is used to urge said one pawl into said latched position.

10. The latching mechanism of claim 7, wherein said one pawl includes a recess for engaging a third restraining pin as said handle is used to urge said one pawl into engagement with said first restraining pin.

11. A pallet having a latching mechanism for securing the pallet to a rail assembly, wherein the rail assembly is fixedly secured to an interior portion of a vehicle and includes a plurality of spaced apart restraining pins to enable the pallet to be quickly and easily latched to and unlatched from the rail assembly, to thereby permit the pallet to be readily secured to or detached from the rail assembly, the pallet comprising:

a pallet member for supporting items thereon;

a latching mechanism having a frame carried within an opening in said pallet member, said latching mechanism including:

a first pawl pivotally secured to said frame, said first pawl including a manually graspable handle and a biasing member associated therewith for biasing said first pawl into an unlatched position relative to said restraining pins;

a second pawl pivotally secured to said frame adjacent said first pawl, said second pawl having a biasing member for urging said second pawl into an unlatched position relative to said rail assembly; and each of said pawls having surfaces adapted to cammingly engage with one another as said first pawl is moved from said unlatched to a latched position in engagement with a first one of said restraining pins via movement of said handle, and wherein said first pawl operates to urge said second pawl into a latched position in engagement with a second one of said restraining pins as said first pawl engages said first one of said restraining pins to thereby secure said pallet member to said rail assembly.

12. The pallet of claim 11, wherein said latching mechanism further includes a safety latching system for securing said handle in a closed position once said pawls have each been urged into said latched positions.

13. The pallet of claim 12, wherein said safety latching system comprises a safety restraining pin carried by said frame; and a safety latching member pivotally supported on said handle for engaging with said safety restraining pin as said handle is moved into said closed position.

14. The pallet of claim 13, wherein said safety latching member includes a biasing member for biasing said safety latching member into a closed position relative to said safety restraining pin.

15. The pallet of claim 13, wherein said handle comprises an independent component pivotally secured to said pawl; and wherein said handle includes an adjustment member for enabling adjustment of a position of said handle such that when said handle is moved into said closed position, said safety latch member automatically engages said safety restraining pin.

16. The pallet of claim 11, wherein said first pawl includes a recess for engaging a third one of said restraining pins when said handle moves said first pawl into said latched position.

17. A latching mechanism for use with a pallet to secure the pallet to a rail assembly, wherein the rail assembly is fixedly secured to a portion of a vehicle and includes a plurality of spaced apart restraining pins, to enable the pallet to be quickly and easily latched to and unlatched from the rail assembly, to thereby permit the pallet to be readily secured to or detached from the rail assembly, the latching mechanism comprising:

at least one frame member having a first opening, a second arcuate opening and a third arcuate opening;

a pawl pivotally secured to said frame member, said pawl including a manually graspable handle and first, second and third support pins, said pawl further including a pair of spaced apart recesses adapted to engage first and second restraining pins when said pawl is moved into a latched position relative to said first and second restraining pins;

said first support pin engaging within said first opening;

said second support pin engaging within said second arcuate opening; and said third support pin engaging within said third arcuate opening; and wherein movement of said handle to urge said pawl into said latched position causes said support pins to be guided by said openings in said frame member such that said pair of recesses of said pawl engage said first and second restraining pins to thereby restrain said pallet against fore and aft movement.

* * * * *